United States Patent Office 3,395,161
Patented July 30, 1968

3,395,161
Δ⁵ and Δ³,⁵-C-6 SUBSTITUTED PROGESTERONES
Arvin P. Shroff, Somerville, N.J., assignor to Ortho
Pharmaceutical Corporation, a corporation of New
Jersey
No Drawing. Filed June 7, 1965, Ser. No. 462,076
3 Claims. (Cl. 260—397.4)

ABSTRACT OF THE DISCLOSURE

Δ³,⁵-C-6 substituted progesterones are intermediates in the preparation of Δ⁵-C-6 substituted progesterones. The Δ⁵-C-6 substituted progesterones possess high progestational activity, but little, if any, antiovulatory activity.

This invention relates to certain novel steroid compounds and to the processes for their preparation. More particularly it relates to novel Δ⁵-C-6-substituted progesterones which exhibit high progestational activity while possessing little, if any, antiovulatory activity and to the Δ³,⁵-C-6-substituted progesterone intermediates.

The novel compounds and processes of the present invention are illustrated by the following reaction scheme:

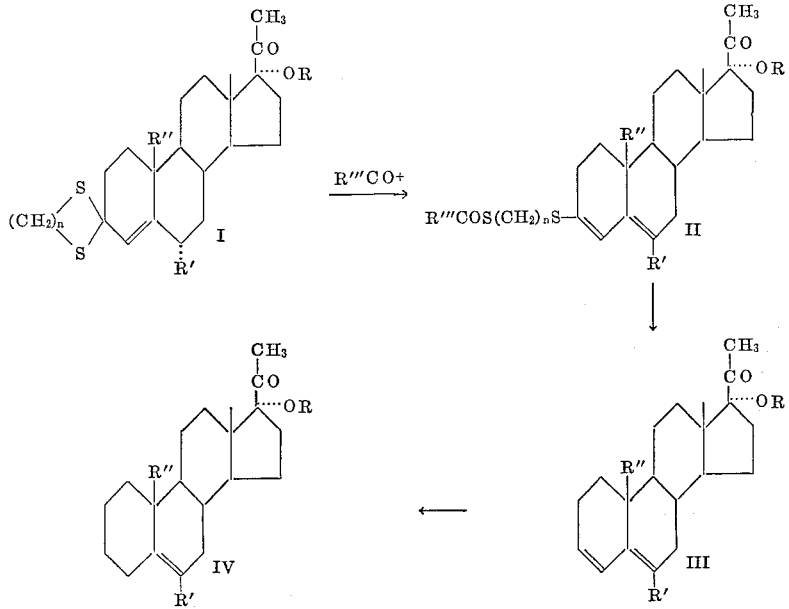

wherein R is hydrogen or lower alkanoyl, R' is methyl and ethyl, R" is hydrogen or methyl, R‴ is lower alkyl, and n is 2 or 3.

The novel compounds of the invention are embraced by Formulae III and IV of the above reaction scheme.

The process for the preparation of the novel compounds of the invention comprises the following steps:

(1) The 17α-acyloxy (or hydroxy)-6α-substituted-3-alkylene thioketals represented by Formula I are treated with a mixture of a carboxylic acid and trifluoro-acetic anhydride, or a carbonyl halide or carboxylic anhydride in the presence of a strong acid to give the corresponding 3,5-dienethioenolether of Formula II. The opening of the thioketal group to give the thioenol ether is described in U.S. S.N. 341,762 filed Jan. 31, 1964.

(2) The compound of Formula II is desulfurized with Raney nickel to give the corresponding 3,5-dien of Formula III.

(3) The thus produced 3,5-dien (III) is selectively hydrogenated in the presence of glacial acetic acid and palladium on charcoal to give the desired Δ⁵-compound of the Formula IV.

While the reaction scheme and process illustrated above is directed to the 17α-substituted compounds, the same process may be used to prepare the novel Δ³,⁵ and Δ⁵-6-substituted-16α-methyl progesterones starting with the appropriate 3-alkylene thioketal.

The following examples illustrate the present invention.

EXAMPLE I 3-(β-acetylthioethylthio)-6-methyl-17α-acetoxy-pregn-3,5-dien-20-one A mixture of 2.0 g. of 6α-methyl-17α-acetoxy-progesterone 3-ethylenethioketal, 5 ml. of methylene chloride, 5 ml. of ethyl ether, 2 ml. of acetyl chloride, and 2 ml. of boron trifluoride etherate is stirred at 25° C. for one hour and the resulting clear solution is poured into 200 ml of cold water. After neutralizing with sodium bicarbonate, the aqueous mixture is extracted with three small portions of methylene chloride. The residue from evaporation of the methylene chloride solution is recrystallized from ether to afford 1.8 g. of 3-(β-acetylthioethylthio)-6-methyl-17α-acetoxypregn-3,5-dien-20-one as pale yellow prisms of melting point 134°–135° C.

*Analysis.*—Calculated for $C_{28}H_{40}O_4S_2$. Theoretical: C, 66.60; H, 7.98. Found: C, 66.44; H, 8.09.

λλ Max.—235, 276 mμ; 5.76, 5.82, 5.90, 6.25, 8.77 μ

EXAMPLE II

17α-acetoxy-6-methylpregn-3,20-dien-20-one 8 teaspoonsful of Raney nickel is suspended in mechanically stirred acetone (800 ml.) and is refluxed under nitrogen for one-half hour. The mixture is brought to room temperature and is treated with 8.0 g. of 3-(β-acetylthioethylthio) - 6 - methyl - 17α - acetoxypregn-3,5-dien-20-one in 100 ml. of tetrahydrofuran. Stirring is continued for two and one-half hours. The reaction mixture is filtered and the filtrate is evaporated to give an oil. The oil is recrystallized from ether-hexane to yield 17α-acetoxy-6-methylpregn-3,5-dien-20-one, M.P. 132–133

$\lambda_{max.}^{EtOH}$ 241 mμ

Calculated for $C_{24}H_{34}O_3$. Theoretical: C, 77.80; H, 9.25. Found: C, 77.61; H, 9.20.

Following the procedure of Example II, but starting with:

(1) 3-(β-acetylthioethylthio)-6-ethyl-17α-acetoxypregn-3,5-dien-20-one, and
(2) 3-(β-acetylthioethylthio)-6-methyl-17α-propionoxypregn-3,5-dien-20-one, yields, respectively:
    (1) 17α-acetoxy-6-ethylpregn-3,5-dien-20-one, and
    (2) 17α-propionoxy-6-methylpregn-3,5-dien-20-one.

EXAMPLE III

17α-acetoxy-6-methylpregn-5-en-20-one 1.0 g. of 17α-acetoxy-6-methylpregn-3,5-dien-20-one is treated with 15.0 ml. of glacial acetic acid and 700 mg. of palladium on charcoal. The mixture is hydrogenated at room temperature until one mole equivalent of theoretical hydrogen is consumed. The mixture is filtered and the filtrate is evaporated to give an oil. Repeated recrystallization from hexane gives 17α-acetoxy-6-methylpregn-5-en-20-one, M.P. 166–168°, $\lambda_{max.}^{cyclohexane}$ 198 m$\mu$ (E 8900)

N.M.R. shows no vinyl protons.

Calculated for $C_{24}H_{36}O_3$. Theoretical: C, 77.37; H, 9.74. Found: C, 77.39; H, 10.06.

Following the procedure of Example III, but starting with:

(1) 17α-acetoxy-6-ethylpregn-3,5-dien-20-one, and
(2) 17α-propionoxy-6-methylpregn-3,5-dien-20-one, yields, respectively;
    (1) 17α-acetoxy-6-ethylpregn-5-en-20-one, and
    (2) 17α-propionoxy-6-methylpregn-5-en-20-one.

EXAMPLE IV 3-(β-acetylthioethylthio)-6,16α-dimethylpregn-3,5-dien-20-one 7.2 g. of 6α,16α-dimethylprogesterone 3-ethylenethioketal is treated with 75 ml. of acetic anhydride, 25 ml. of trifluoroacetic anhydride and is heated on a steam bath for one-half hour. The mixture is poured over ice-water and is extracted with methylene chloride. The organic layer is washed with sodium bicarbonate, and water, is dried over sodium sulfate and is evaporated to give 6.9 g. of 3-(β-acetylthioethylthio)-6,16α-dimethylpregn-3,5-dien-20-one as a brown oil.

EXAMPLE V 6,16α-dimethylpregn-3,5-dien-20-one

Seven teaspoonsful of Raney nickel is added to 700 ml. of mechanically stirred acetone. The mixture is refluxed under nitrogen for one-half hour and is allowed to cool to room temperature. To this is slowly added 6.9 g. of 3-(β-acetylthioethylthio)-6,16α-dimethylpregn-3,5-dien-20-one (prepared by the method of Example IV) dissolved in 75 ml. of tetrahydrofuran and stirring is continued for three and one-half hours. The mixture is filtered and the filtrate is evaporated to give a dark colored residue. The residue is chromatographed on neutral alumina and eluted with 9:1 hexane-ether. Evaporation of the solvent followed by recrystallization from hexane gives 6,16α-dimethylpregn-3,5-dien-20-one, M.P. 125°–126°, $\lambda_{max.}^{EtOH}$ 241 m$\mu$ Calculated for $C_{23}H_{34}O$. Theoretical: C, 84.60; H, 10.50. Found: C, 84.75; H, 10.70.

EXAMPLE VI 6,16α-dimethylpregn-5-en-20-one 500 mg. of 6,16α-dimethylpregn-3,5-dien-20-one is dissolved in 15 ml. of glacial acetic acid and is treated with 250 mg. of palladium on charcoal. The mixture is hydrogenated at room temperature until one mole equivalent of theoretical hydrogen is consumed. The mixture is filtered and the filtrate is evaporated to give 6,16α-dimethylpregn-5-en-20-one as an oil. The N.M.R. shows no vinyl protons.

Analyzed as an oxime of M.P. 75°–76°. Calculated for $C_{23}H_{37}NO$. Theoretical: C, 80.41; H, 10.86; N, 4.08. Found: C, 80.37; H, 11.06; N, 4.02.

What is claimed is:

1. 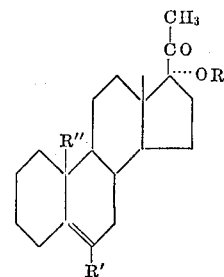

wherein R is selected from the group consisting of hydrogen and lower alkanoyl, R' is selected from the group consisting of methyl and ethyl, and R'' is selected from the group consisting of hydrogen and methyl.

2. 17α-acetoxy-6-methylpregn-5-en-20-one.
3. 17α-hydroxy-6-methylpregn-5-en-20-one.

References Cited

UNITED STATES PATENTS 3,099,655    7/1963    Zderic et al. _____ 260—397.3

LEWIS GOTTS, *Primary Examiner.*

E. G. LOVE, *Assistant Examiner.*